(12) United States Patent  
Jau et al.

(10) Patent No.: US 8,943,338 B2
(45) Date of Patent: Jan. 27, 2015

(54) SERVER POWER SYSTEM

(75) Inventors: Maw-Zan Jau, Taipei (TW); Tzu-Hung Wang, Keelung (TW)

(73) Assignee: Quanta Computer Inc., Tao Yuan Shien (TW)

( * ) Notice: Subject to any disclaimer, the term of this patent is extended or adjusted under 35 U.S.C. 154(b) by 217 days.

(21) Appl. No.: 13/480,876

(22) Filed: May 25, 2012

(65) Prior Publication Data

US 2013/0227310 A1  Aug. 29, 2013

(30) Foreign Application Priority Data

Feb. 29, 2012  (TW) .............................. 101106596 A

(51) Int. Cl.
*G06F 1/00*  (2006.01)
*H02J 9/00*  (2006.01)
*G06F 11/00*  (2006.01)
*G06F 1/26*  (2006.01)

(52) U.S. Cl.
CPC ........................................ *G06F 1/26* (2013.01)
USPC ................ 713/300; 713/330; 307/64; 714/14

(58) Field of Classification Search
USPC ................ 713/340, 300, 330; 307/64; 714/14
See application file for complete search history.

(56) References Cited

U.S. PATENT DOCUMENTS

| | | | | |
|---|---|---|---|---|
| 6,040,640 A * | 3/2000 | Gehre et al. | ..................... | 307/66 |
| 7,634,673 B2 * | 12/2009 | Chou | ............................. | 713/300 |
| 8,125,194 B2 * | 2/2012 | Nethken | ........................ | 320/137 |
| 8,582,268 B2 * | 11/2013 | Yamamoto et al. | .......... | 361/93.9 |
| 2009/0049322 A1 * | 2/2009 | Chang | ............................ | 713/340 |

* cited by examiner

*Primary Examiner* — Stefan Stoynov
(74) *Attorney, Agent, or Firm* — Novak Druce Connolly Bove + Quigg LLP

(57) ABSTRACT

A power server system includes a power transmission interface, a power supply and a battery backup unit (BBU). The power supply converts an AC power into a DC power and outputs the DC power to the power transmission interface. After the AC power is disconnected, the power supply continues outputting the DC power in a holding period having a rising period and a current sharing period. The BBU outputs a redundant power to the power transmission interface before the power supply stops outputting the DC power. The BBU boosts the voltage level of the redundant power in the rising period, and controls the voltage level of the redundant power to be the same with that of the DC power in the current sharing period, so that the battery output inrush current is reduced and the battery life is extended.

10 Claims, 4 Drawing Sheets

SERVER POWER SYSTEM

This application claims the benefit of Taiwan application Serial No. 101106596, filed Feb. 29, 2012, the subject matter of which is incorporated herein by reference.

BACKGROUND OF THE INVENTION

1. Field of the Invention

The invention relates in general to a power system, and more particularly to a power server system.

2. Description of the Related Art

Referring to FIG. 1, a signal timing diagram of conventional BBU and power supply is shown. The power supply converts an AC power VAC into a DC power VDC1. When the AC power VAC is disconnected, the power supply generates an AC OK signal ACOK, and the power supply continues outputting the DC power VDC1 in a holding period $T_{hold}$.

When the holding period $T_{hold}$ terminates, the power supply stops outputting the DC power VDC1, and the conventional battery backup unit (BBU) must instantaneously provide a redundant power VDC2 whose voltage level is the same with that of the DC power VDC1. However, the battery output current Iout' of the conventional BBU generates an increasing current at the instant when the power supply stops outputting the DC power VDC1. In addition, the battery output voltage Vout' of the conventional BBU drops dramatically at the instant when the power supply stops outputting the DC power VDC1.

SUMMARY OF THE INVENTION

The invention is directed to a power server system.

According to an embodiment of the present invention, a power server system is disclosed. The power server system comprises a power transmission interface, a power supply and a battery backup unit (BBU). The power supply converts an AC power into a DC power and then outputs the DC power to the power transmission interface. After the AC power is disconnected, the power supply continues outputting the DC power in a holding period having an arising period (a rising period) and a current sharing period adjacent to the arising period. The BBU outputs a redundant power to the power transmission interface before the power supply stop outputting the DC power. The BBU boosts the voltage level of the redundant power in the arising period, and in the current sharing period controls the voltage level of the redundant power to be the same with that of the DC power.

The above and other aspects of the invention will become better understood with regard to the following detailed description of the preferred but non-limiting embodiments. The following description is made with reference to the accompanying drawings.

DETAILED DESCRIPTION OF THE INVENTION

First Embodiment

Figure 1:
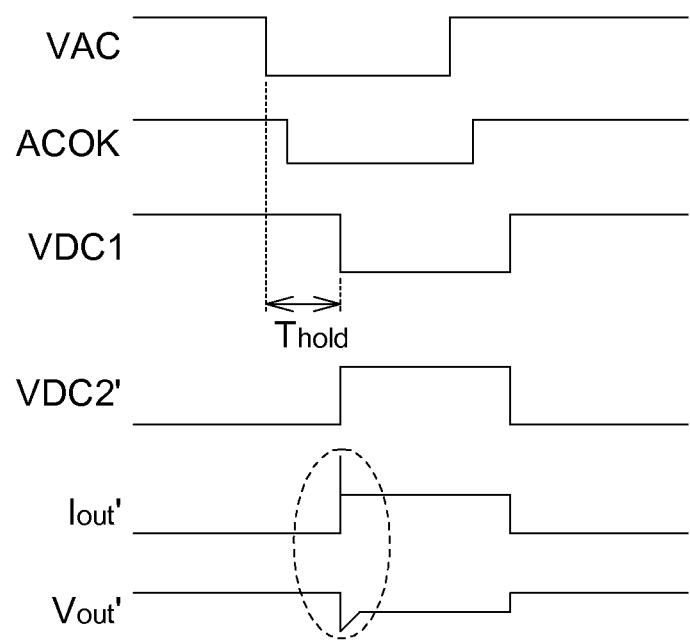
FIG. 1 shows a signal timing diagram of conventional BBU and power supply.
Figure 2:
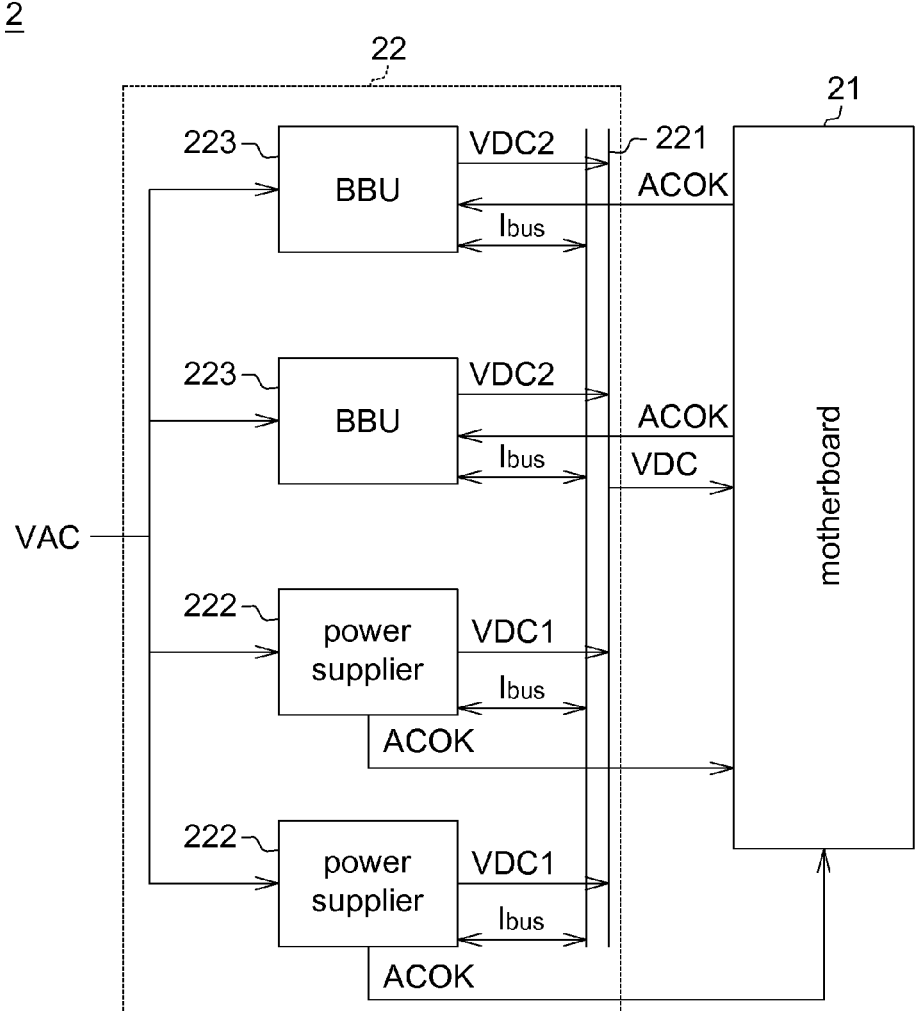
FIG. 2 shows an architecture diagram of a server system according to a first embodiment.
Figure 3:
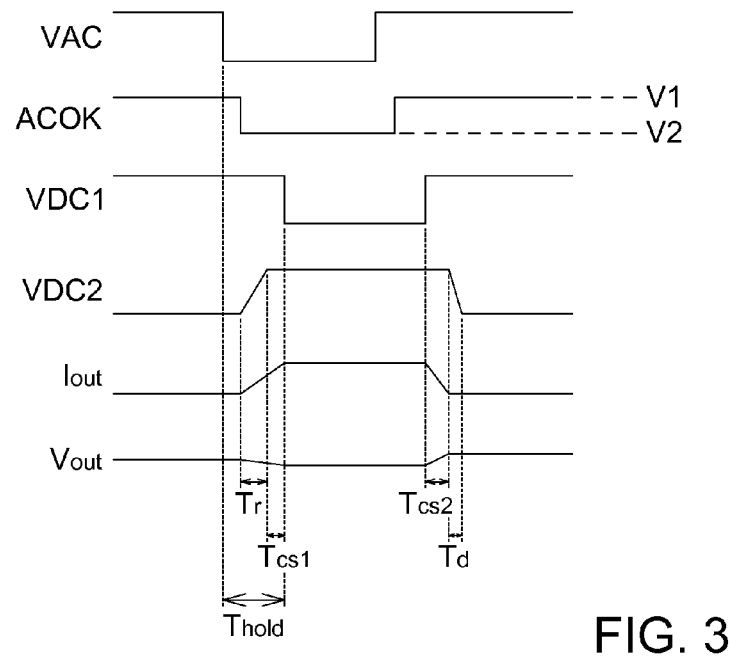
FIG. 3 shows a signal timing diagram of according to a first embodiment.

Referring to both FIG. 2 and FIG. 3. FIG. 2 shows an architecture diagram of a server system according to a first embodiment. FIG. 3 shows a signal timing diagram of according to a first embodiment. Server system 2 comprises a motherboard 21 and a power server system 22. The power server system 22 comprises a power transmission interface 221, a power supply 222 and a battery backup unit (BBU) 223. The power transmission interface 221, used for connecting the power supply 222 and the BBU 223 in parallel, is realized by such as a current bus.

The power supply 222 converts an AC power VAC into a DC power VDC1 and then outputs the DC power to the power transmission interface 221. The motherboard 21 obtains the required power load VDC via the power transmission interface 221. After the AC power VAC is disconnected, the power supply 222 continues outputting the DC power VDC1 in the holding period $T_{hold}$. The AC power VAC may be disconnected due to power line disconnection or power cut. The holding period $T_{hold}$ is about 10 ms. The holding period $T_{hold}$ comprises an arising period (a rising period) $T_r$ and a current sharing period $T_{cs1}$ adjacent to the arising period The BBU 223 outputs the redundant power VDC2 to the power transmission interface 221 before the power supply 222 stops outputting the DC power VDC. The BBU 223 boosts the voltage level of the redundant power VDC2 in the arising period $T_r$, and controls the voltage level of the redundant power VDC2 to be the same with that of the DC power VDC1 in the current sharing period $T_{cs1}$ so as to achieve current sharing effect.

When the AC power VAC is disconnected, the AC OK signal ACOK generated by the power supply 222 changes to a fault level V2 from a normal level V1. The normal level V1 is such as logic 1, and the fault level V2 is such as logic 0. When the AC OK signal ACOK changes to the fault level V2 from the normal level V1, the BBU 233 starts to boost the voltage level of the redundant power VDC2 according to the AC OK signal ACOK.

In other words, after the AC OK signal ACOK changes to fault level V2 from the normal level V1, the BBU 223 boosts the voltage level of the redundant power VDC2 in the arising period $T_r$ until the voltage level of the redundant power VDC2 is the same with that of the DC power VDC1. Then, the BBU 223 maintains the voltage level of the redundant power VDC2 at the same level of the DC power VDC1 in the current sharing period $T_{cs1}$ to achieve the effect of current sharing.

The BBU 223 suitably adjusts the voltage level of the redundant power VDC2 in the arising period $T_r$ and the current sharing period $T_{cs1}$ to avoid the battery output current Iout of the BBU 223 generating an increasing current at the instant when the power supply 222 stops outputting the DC power VDC1, avoid the battery output voltage Vout of the BBU 223 dropping dramatically at the instant when the power supply 222 stops outputting the DC power VDC1, and avoid the battery life being shortened.

When the grid power resumes normal operation, the AC OK signal ACOK generated by the power supply 222 changes to the normal level V1 from the fault level V2. After the AC OK signal ACOK changes to the normal level V1 from the fault level V2, the BBU 223, according to the AC OK signal ACOK, maintains the voltage level of the redundant power VDC2 at the level of the DC power VDC1 in the current sharing period $T_{cs2}$ to achieve the effect of current sharing. Then, the BBU 223 decreases the voltage level of the redundant power VDC2 to 0 in the descending period $T_d$ following the current sharing period $T_{cs2}$.

Figure 4:
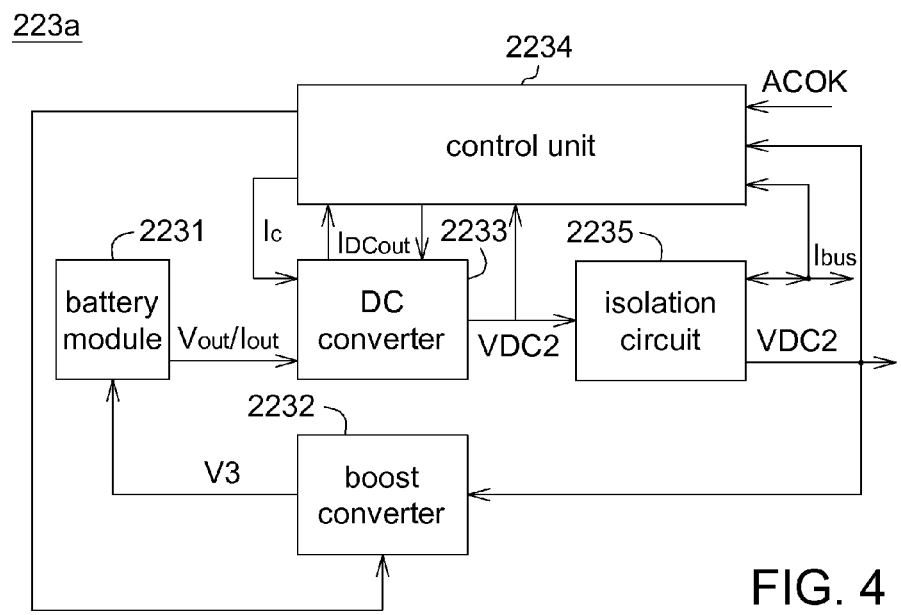
FIG. 4 shows a schematic diagram of a BBU according to a first embodiment.

Referring to FIG. 4, a schematic diagram of a BBU according to a first embodiment is shown. In the first embodiment, the BBU 223 is exemplified by a BBU 223a. The BBU 223a comprises a battery module 2231, a boost converter 2232, a DC converter 2233, a control unit 2234 and an isolation circuit 2235. The boost converter 2232 provides a charging voltage V3 to charge the battery module 2231. The control unit 2234 is realized by such as a micro controller or a digital signal processor (DSP). The control unit 2234, according to the AC OK signal ACOK, the loading signal $I_{bus}$ of the power transmission interface 221 and the output current signal $I_{DCout}$ of the DC converter 2233, outputs a control signal Ic for controlling the DC converter 2233 to convert the charging voltage V3 outputted from the battery module 2231 into a redundant power VDC2. The isolation circuit 2235 is realized by such as an ORing FET and a current sharing circuit. When abnormality occurs to the power supply 222, the isolation circuit 2235 provides the redundant power VDC2 to the power transmission interface 221.

Second Embodiment

Figure 5:
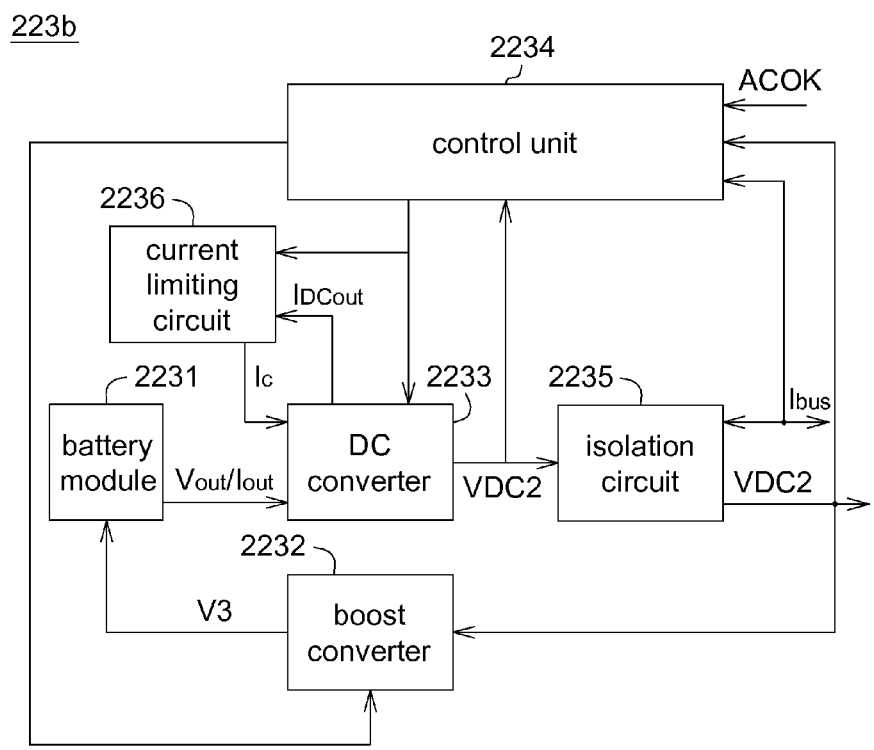
FIG. 5 shows a schematic diagram of a BBU according to a second embodiment.

Referring to FIG. 5, a schematic diagram of a BBU according to a second embodiment is shown. In the second embodiment, the BBU 223 is exemplified by a BBU 223b. The BBU 223b is different from the BBU 223a mainly in that the BBU 223b further comprises a current limiting circuit 2236. The BBU 223b comprises a battery module 2231, a boost converter 2232, a DC converter 2233, a control unit 2234, an isolation circuit 2235 and a current limiting circuit 2236. The boost converter 2232 provides a charging voltage V3 to charge the battery module 2231.

The control unit 2234 is realized by such as a micro controller or a digital signal processor (DSP). The control unit 2234, according to the AC OK signal ACOK, the loading signal $I_{bus}$ of the power transmission interface 221 and the output current signal $I_{DCout}$ of the DC converter 2233, outputs a control signal Ic to control the DC converter 2233 to convert the charging voltage V3 outputted from the battery module 2231 into a redundant power VDC2. The control unit 2234 controls the DC converter 2233 to convert the charging voltage V3 outputted from the battery module 2231 into a redundant power VDC2. When the output current signal $I_{DCout}$ generated by the DC converter 2233 is larger than a threshold, the current limiting circuit 2236 limits the output current signal $I_{DCout}$ to be equal to the threshold.

The isolation circuit 2235 is realized by such as an ORing FET and a current sharing circuit. When abnormity occurs to the power supply 222, the isolation circuit 2235 provides the redundant power VDC2 to the power transmission interface 221.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power server system, comprising:
a power transmission interface;
a power supply used for converting an AC power into a DC power and then outputting the DC power to the power transmission interface, wherein after the AC power is disconnected, the power supply continues outputting the DC power in a holding period having a rising period and a current sharing period adjacent to the rising period; and
a battery backup unit (BBU) used for outputting a redundant power to the power transmission interface before the power supply stop outputting the DC power, wherein the BBU boosts the voltage level of the redundant power in the rising period, and controls the voltage level of the redundant power to be the same with that of the DC power in the current sharing period; and
the BBU continuously provides the redundant power while the AC power is disconnected.

2. The power server system according to claim 1, wherein when the power is disconnected, an AC OK signal generated by the power supply changes to a fault level from a normal level, and when the AC OK signal changes to the fault level from the normal level, the BBU start to boost the voltage level of the redundant power according to the AC OK signal.

3. The power server system according to claim 2, wherein after the grid power resumes normal operation, an AC OK signal generated by the power supply changes to the normal level from the fault level, and when the AC OK signal changes to the normal level from the fault level, the BBU controls the voltage level of the redundant power to be the same with that of the DC power according to the AC OK signal in another current sharing period, and decreases the voltage level of the redundant power in a descending period following another current sharing period.

4. The power server system according to claim 1, wherein the BBU comprises:
a battery module;
a boost converter used for providing a charging voltage to charge the battery module;
a DC converter;
a control unit used for outputting a control signal according to an AC OK signal, a loading signal of the power transmission interface and an output current signal of the DC converter to control the DC converter to convert the charging voltage outputted from the battery module into the redundant power; and
an isolation circuit, wherein when abnormality occurs to the power supply, the isolation circuit provides the redundant power to the power transmission interface.

5. The power server system according to claim 4, wherein the control unit is realized by a micro controller.

6. The power server system according to claim 4, wherein the control unit is realized by a digital signal processor (DSP).

7. The power server system according to claim 1, wherein the BBU comprises:
a battery module;
a boost converter used for providing a charging voltage to charge the battery module;
a DC converter;
a control unit used for controlling the DC converter to convert the charging voltage outputted from the battery module into the redundant power;
a current limiting circuit used for limiting the output current signal to be equal to the threshold when an output current signal generated by the DC converter is larger than a threshold; and
an isolation circuit, wherein when abnormality occurs to the power supply, the isolation circuit provides the redundant power to the power transmission interface.

8. The power server system according to claim 7, wherein the control unit is realized by a micro controller.

9. The power server system according to claim 7, wherein the control unit is realized by a digital signal processor (DSP).

10. The power server system according to claim 1, wherein the power transmission interface is realized by a current bus.

* * * * *